Nov. 22, 1932.     F. G. HUGHES ET AL     1,888,634
RETAINER OR SEPARATOR FOR ANTIFRICTION BEARINGS
Filed May 28, 1928

INVENTORS:
CHARLES B. SIMMONS,
FREDERICK G. HUGHES,
BY *Gales P. Moore*
THEIR ATTORNEY.

Patented Nov. 22, 1932

1,888,634

UNITED STATES PATENT OFFICE

FREDERICK G. HUGHES AND CHARLES B. SIMMONS, OF BRISTOL, CONNECTICUT, ASSIGNORS TO THE NEW DEPARTURE MANUFACTURING COMPANY, OF BRISTOL, CONNECTICUT, A CORPORATION OF CONNECTICUT

RETAINER OR SEPARATOR FOR ANTIFRICTION BEARINGS

Application filed May 28, 1928. Serial No. 281,200.

This invention relates to retainers or separators for antifriction bearings and comprises all the features of novelty herein disclosed. An object of the invention is to provide a light, strong retainer which will rotatably hold its rolling elements with little friction. Another object is to provide an improved retainer capable of easy assembly with its rolling elements and wherein the pockets for the rolling elements will tend to free themselves from foreign matter. To these ends and also to improve generally and in detail upon devices of this general character, the invention consists in the various matters hereinafter described and claimed.

In its broader aspects, the invention is not necessarily limited to the specific embodiment selected for illustration in the accompanying drawing in which.

Figure 1:
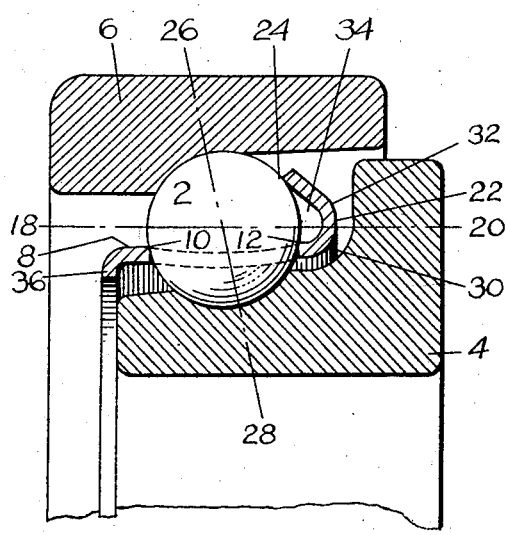
Fig. 1 is a cross sectional view of a portion of a ball bearing utilizing the improved retainer.
Figure 2:
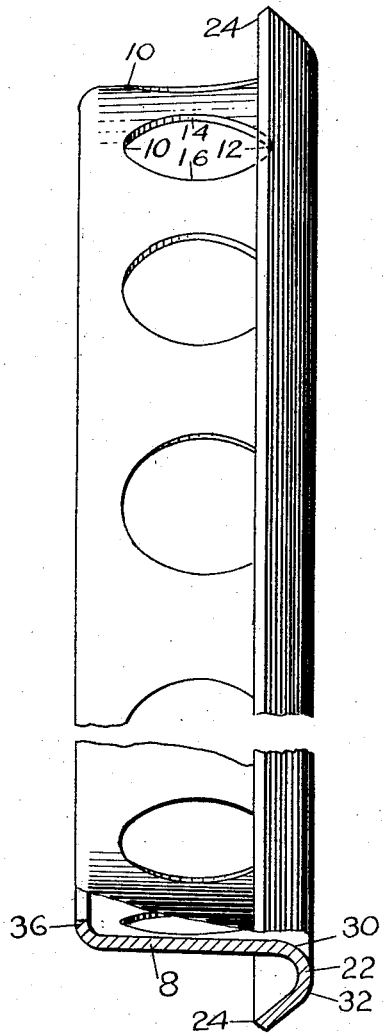
Fig. 2 is an elevation of the retainer broken away and in section.

The retainer is illustrated in connection with a circular series of balls 2 running on raceways of an inner race ring 4 and an outer race ring 6 of an angular contact bearing. The retainer comprises a band or body portion 8 of substantially cylindrical form with openings for the rolling elements which bear against the rims of the openings in the region of the points 10 and 12. The body portion 8 is straight in cross section and preferably has a very small taper to facilitate stripping the formed material from its die but departs very little from a cylindrical surface. Its diameter is a little less than that of the circle through the centers of the rolling elements. When the rolling elements are balls as indicated, the openings are conveniently formed by a cylindrical punch smaller than the balls and reciprocated in a direction normal to the body portion. The openings are accordingly circular as viewed from the center of the retainer but, due to the cylindrical curvature of the band, the rims of the openings will not contact with the balls at the front or rear in the region of the points 14 and 16, but only near the points 10 and 12 which are near the axes of rotation of the balls. The rim of each opening accordingly engages its ball wholly on that half of the ball which is nearer to the inner race ring and on one side of a plane through the center of the ball, such plane being indicated by line 18—20 in Fig. 1 and intersecting the ball in a great circle.

A resilient curved flange 22 is formed at one edge of the body portion 8 and has an annular edge portion 24 engaging each ball at a point on that half of the ball which is farther from the inner race ring, or on the opposite side of the plane indicated by line 18—20. This point is spaced a slightly shorter distance than ball diameter from the point 10 so that the ball can be forced by elastic deformation into its opening where it is retained and guided, the rim of the opening furnishing two points of contact at 10 and 12 and the resilient edge portion 24 furnishing the other point of contact. Thus each ball is retained by three-point contact with the retainer, one point 10 being at one end of the axis of rotation of the ball (which axis is at right angles to the angular contact line 26—28 of the bearing) and the other two points 12 and 24 being near but straddling the other end of said axis. All three points are sufficiently close to one another to guide and control the balls when the bearing is in use while also retaining the balls assembled when the race rings are removed. With respect to the center of the retainer the point 12 is inside the axis of rotation of the ball and the point 24 is outside of it. The flange is formed by bending the metal outwardly at 30 from the body portion and laterally at 32 towards the balls leaving a clearance space at 34 between the ball and the flange. The ball openings are preferably punched from outside the separator before the final bending of the flange. This gives clean cut surfaces for contact with the balls and the burrs that may be left by the punch come at the inner surface of the retainer where they do not touch the balls. Preferably, also, the rims of the ball openings are struck with a ball shaped punch to make them conform to the balls for a portion of the thickness of the metal in the region of points 10 and 12. A stiffening flange 36 is bent inwardly at an angle from the other edge of the body portion in a direction substantially opposite to the ball retaining flange 22 and at a point beyond the end of the inner race ring. The retainer thus has a cross section of considerable radial extent to give it strength. With the rims of the ball openings engaging the balls at points or small areas on their inner hemispheres and with spaces between the rims and the front and rear of the balls, foreign matter tends to become dislodged from the retainer by centrifugal force. The contact of the retainer with the balls at points or small areas where the velocity of rotation is small lessens friction. Instead of forcing the balls into their openings after bending the flange 22, the balls may first be placed in their openings and the flange pressed down against them, the tendency of the flange to spring back a very little giving a desirable amount of running clearance without letting the balls escape.

We claim:

1. The combination with a rolling antifriction-member, of a cage therefor having at one side of said antifriction-member a portion that contacts with said antifriction-member at substantially the pole of said antifriction-member's axis of rotation, and also having at the other side of said antifriction-member portions that contact with said antifriction-member at points upon opposite sides of said axis of rotation, said antifriction-member and said cage being out of contact with each other at other points; substantially as described.

2. The combination with a rolling antifriction-member, of a cage therefor having at one side of said antifriction-member a portion that contacts with said antifriction-member at substantially the pole of said antifriction-member's axis of rotation, said cage having at the other side of said antifriction-member one portion that contacts with said antifriction-member at a point upon one side of said axis and a second portion that contacts with the periphery of said antifriction-member at the other side of said axis, said cage and antifriction-member being out of contact with each other at other points; substantially as described.

3. The combination with a ball, of a cage therefor comprising a body portion having an opening that is of less diameter than said ball and is so shaped that one side of a ball resting therein contacts with the said body portion at substantially one pole of the axis of rotation of said ball and the other side of the ball contacts with said body portion at a point at one side of said axis, said ball and body portion being out of contact with each other at other points, and a flange upon said body portion at the side of the ball opposite said pole and contacting with said ball on the side of its said axis opposite that upon which said body portion contacts; substantially as described.

4. The combination with a circular series of balls, of a cage therefor comprising a generally-cylindrical body portion having substantially circular ball-receiving openings of less diameter than said balls, whereby when assembled said balls contact with the rims of their respective said openings at only two points, the said point at one side of a said ball being at substantially one pole of the axis of rotation of the ball and the other of said points being at the other side of said ball and at one side of said axis, and a flange upon said body portion and contacting with said balls upon the other side of their said axes; substantially as described.

5. In a device of the character described, a circular series of balls, a one-piece retainer comprising a body portion of substantially straight cross section with openings receiving the balls, the rim of each opening having only two possible points of engagement with the ball, these points lying inside of a great circle of the ball, one of said points lying at the axis of rotation of the ball and the other near said axis but inside of it, the rim being out of contact with the front and rear of the ball, and a flange bent outwardly from one edge of the body portion in spaced relation to the ball and having an annular edge portion engaging each ball at a point on the outside of said great circle and on the outside of said axis of rotation whereby the ball is held in the retainer by three point contact near its points of least velocity; substantially as described.

6. In an antifriction bearing the combination with race-rings and a circular series of balls therebetween, of a ball cage between said rings and comprising a substantially cylindrical body portion provided with substantially circular ball-receiving openings of less diameter than said balls, the balls at one of their sides contacting with the rims of said respective openings at a point at substantially one pole of the axis of rotation of the ball, and the balls at their other side contacting with said rims at a point upon one side of said axis, a cage portion upon said body portion at the latter mentioned side of said balls and extending away from said body portion toward said axis, and a flange upon said extending portion and extending at an angle therefrom toward said balls and engaging the same at a point upon the side of said axes opposite that upon which said rim engages; substantially as described.

7. In an antifriction bearing, the combination with a circular series of balls, of a cage therefor comprising a substantially cylindrical body portion provided with substantially circular openings of less diameter than said balls and receiving said balls, the balls at one of their sides contacting with the rims of said respective openings at a point at substantially one pole of the axis of rotation of the ball, and the balls at their other side contacting with said rims at a point upon one side of said axis, a cage portion upon said body portion at the latter mentioned side of said balls and curving laterally outwardly from said body portion and also toward said axes, and a flange upon said curved portion and engaging said balls upon the side of the said axes opposite that upon which said balls are engaged by said rim; substantially as described.

8. In a device of the character described, a circular series of rolling elements interposed between a pair of opposed raceways, a one-piece retainer comprising an annular body portion of substantially cylindrical form with a series of openings for the rolling elements, the rim of each opening being located to engage its rolling element wholly on the inner side of a plane which extends through the center of the rolling element and between the raceways, a single flange extending outwardly from one edge of the body portion and having an annular edge portion to engage each of the rolling elements at a point on the outer side of said central plane when the rolling elements are in load sustaining use between the raceways, the flange being resilient and its edge portion being spaced from the opposite edges of the series of openings a distance slightly less than the maximum dimension of the rolling elements whereby the rolling elements may be forced past the flange into the openings, and a stiffening flange extending inwardly from the other edge of the body portion; substantially as described.

9. In a device of the character described, a circular series of balls to run between an inner race ring and an outer race ring, a one-piece retainer comprising a body portion of substantially cylindrical form with openings receiving the balls, the rim of each opening engaging its ball wholly on that half of the ball which is nearer to the inner race ring, a curved flange bent outwardly from one edge of the body portion and laterally towards the balls and having an annular edge portion engaging each ball at a point on that half of the ball which is further from the inner race ring, the engagement of the flange with the ball holding the rim of the opening and the ball in running relation when the bearing is in use, the distance between the annular edge portion of the flange and the opposite edges of the openings being slightly less than the diameter of the balls and the flange being resiliently displaceable to enable the balls to be forced into their openings, and a stiffening flange bent inwardly from the other edge of the body portion at a point beyond the end of the inner race ring; substantially as described.

10. In an antifriction bearing, the combination with a race-ring having a race-groove therein over one shoulder of which a caged race of balls is adapted to be forced, of a circular series of balls in said groove, and a cage for said balls comprising a substantially cylindrical body portion provided with openings receving said balls and of less diameter than said balls, the cage portion at the side of the balls adjacent said shoulder being free from obstruction to the passage of the balls away from said ring, and a flange upon said body portion at the side of the balls away from said shoulder and spaced from the diametrically opposed points of engagement between the balls and the said body portion a distance less than the diameter of the balls; substantially as described.

In testimony whereof we hereunto affix our signatures.

CHARLES B. SIMMONS.
FREDERICK G. HUGHES.